(12) United States Patent
Heil et al.

(10) Patent No.: US 9,733,943 B2
(45) Date of Patent: Aug. 15, 2017

(54) BRANCH HISTORY CACHE AND METHOD

(75) Inventors: Timothy H. Heil, Sammamish, WA (US); Brent F. Hilgart, Rochester, MN (US); Andrew D. Hilton, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 1119 days.

(21) Appl. No.: 13/613,175

(22) Filed: Sep. 13, 2012

(65) Prior Publication Data

US 2014/0075167 A1    Mar. 13, 2014

(51) Int. Cl.
*G06F 9/30* (2006.01)
*G06F 9/38* (2006.01)

(52) U.S. Cl.
CPC .................................. *G06F 9/3806* (2013.01)

(58) Field of Classification Search
None
See application file for complete search history.

(56) References Cited

U.S. PATENT DOCUMENTS

| 4,370,711 | A | 1/1983 | Smith |
| 6,978,361 | B2 * | 12/2005 | Luick ............................ 712/240 |
| 7,461,243 | B2 | 12/2008 | Ali et al. |
| 2004/0139281 | A1 | 7/2004 | McDonald |

* cited by examiner

*Primary Examiner* — Corey S Faherty
(74) *Attorney, Agent, or Firm* — Martin & Associates, LLC; Derek P. Martin

(57) ABSTRACT

A branch history table cache is a write cache that stores values of branch history counters written to a branch history table. An update to a branch history table counter is reflected in both the branch history table cache and the branch history table. Before a branch history table counter is updated, a check is made to see if the branch history table counter is in the cache. If not, the branch history table counter is updated based on a value of the branch history table counter that was saved during fetch of the branch history table counter. If, however, the branch history table counter value is in the cache, the value in the cache is used to update the branch history table counter. All branches that use the branch history table counter update the correct counter value, improving processor performance by providing more accurate predictions of branches taken.

16 Claims, 5 Drawing Sheets

BRANCH HISTORY CACHE AND METHOD

BACKGROUND

1. Technical Field

This disclosure generally relates to branch prediction to improve processor performance, and more specifically relates to the use of branch history tables to improve processor performance.

2. Background Art

Almost all modern processors use branch prediction to improve performance of program execution. Most branch predictors use a branch history table (BHT) to track outcomes of recent branches. Typically each entry in the branch history table is a 2-bit saturating counter, with a value of 00 representing "strongly not taken", a value of 01 representing "weakly not taken", a value of 10 representing "weakly taken", and a value of 11 representing "strongly taken." The value of a BHT entry is used to predict whether or not a branch will be taken. A saturating counter means that an attempt to increment a maximum value of the counter results in the same maximum value, and an attempt to decrement a minimum value of the counter results in the same minimum value, while incrementing and decrementing between the minimum and maximum occur the same as in typical binary counters, by increasing the value of the counter by one or decreasing the value of the counter by one.

Updates to branch history table counters are typically done by saving the counter value when the counter is fetched from the branch history table, then incrementing or decrementing the saved value once execution shows whether the branch was taken or not. Temporarily saving the value, then incrementing or decrementing the value is typically done because the read port of the branch history table is so busy with fetches that is it unavailable for a subsequent read to determine the current counter value. By saving the counter value when fetched, this eliminates the need of reading the counter a second time to determine the current counter value. However, incrementing or decrementing the saved counter value instead of the current counter value can cause problems when the saved counter value is stale. This can happen, for example, when other branches update the counter value between when a branch fetches the counter and when the branch updates the counter. The result is updating the counter with a value that is other than it should be to provide accurate branch prediction.

One solution to the problem of stale data is to provide a branch history table with two read ports so the value of a BHT counter may be read before updating the counter. A read-modify-write cycle could then assure the counter data is not stale before updating. However, implementing a BHT with two read ports requires additional space and power on the processor, so this is not an ideal solution.

BRIEF SUMMARY

A branch history table cache is a write cache that stores values of branch history counters written to a branch history table. An update to a branch history table counter is reflected in both the branch history table cache and the branch history table. Before a branch history table counter is updated, a check is made to see if the branch history table counter is in the cache. If not, the branch history table counter is updated based on a value of the branch history table counter that was saved during fetch of the branch history table counter. If, however, the branch history table counter value is in the cache, the value in the cache is used to update the branch history table counter. All branches that use the branch history table counter update the correct counter value, improving processor performance by providing more accurate predictions of branches taken.

The foregoing and other features and advantages will be apparent from the following more particular description, as illustrated in the accompanying drawings.

BRIEF DESCRIPTION OF THE SEVERAL VIEWS OF THE DRAWING(S)

The disclosure will be described in conjunction with the appended drawings, where like designations denote like elements, and:

DETAILED DESCRIPTION

Figure 1:
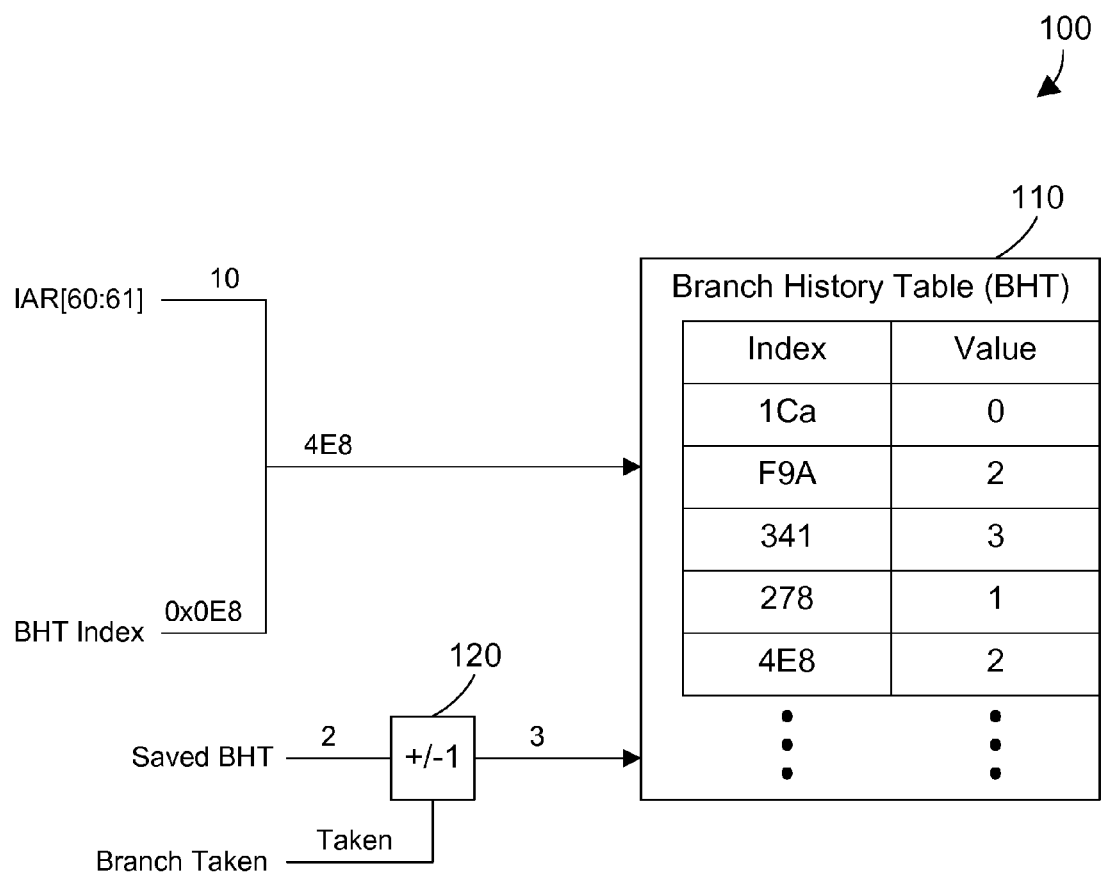
FIG. 1 is a block diagram of a prior art apparatus that includes a branch history table.

A prior art apparatus 100 is shown in FIG. 1 to include a sample prior art branch history table 110. Each entry in the branch history table 110 includes an index and a value. The example in FIG. 1 assumes each entry in the BHT includes four values to support four simultaneous instructions fetches, so two bits from the instruction address register (IAR) are combined with the BHT index to arrive at a unique BHT index in the branch history table. For this specific example, the BHT index is a 10-bit value, and the two IAR bits are concatenated to the BHT index value at the most significant bits. Thus, a BHT index of 0x0E8 concatenated with an IAR of 10 results in the index 4E8 into the branch history table 110.

Figure 2:
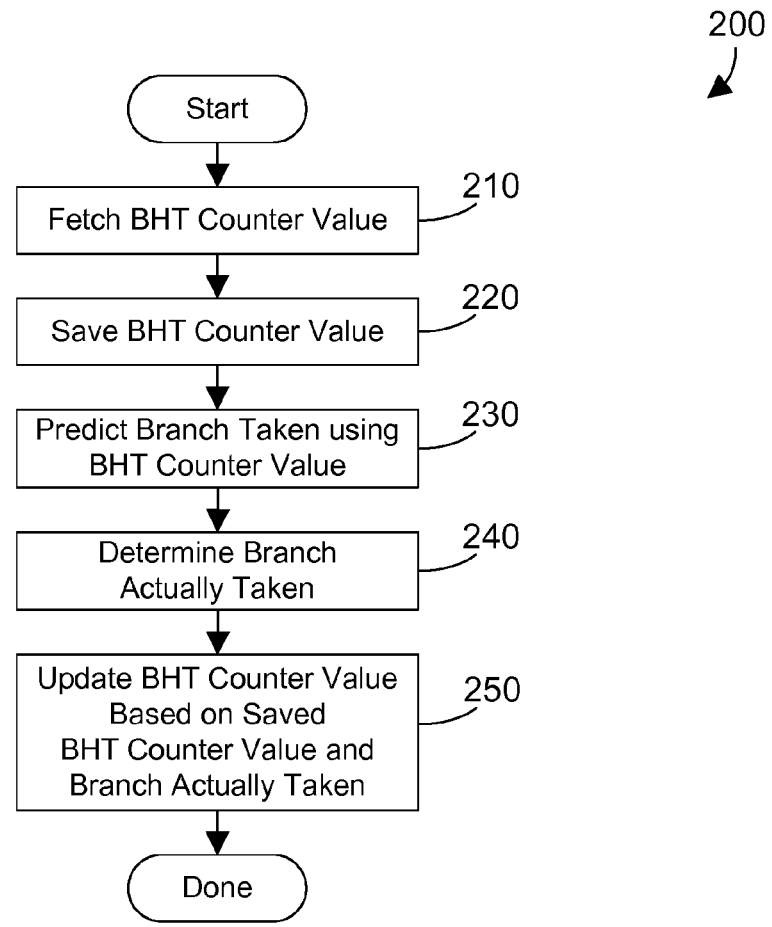
FIG. 2 is a flow diagram of a prior art method for updating the branch history table shown in FIG. 1.

The branch history table 110 in FIG. 1 is used by a processor to improve performance by predicting branches during program execution. The prior art method 200 in FIG. 2 shows the steps for using the prior art branch history counter shown in FIG. 1. The BHT counter value is fetched from the branch history table (step 210). The BHT counter value is saved (step 220). A branch prediction is made using the BHT counter value (step 230). Branch execution eventually determines the branch actually taken (step 240), and updates the BHT counter value based on the saved BHT counter value and based on the branch actually taken (step 250). A simple example will illustrate. We assume the BHT counter at index 4E8 of the branch history table 110 has a value of 2, as shown in FIG. 1. The Saved BHT is 2, and we assume for this example the branch was taken. This results in the updater 120 incrementing the BHT counter to a value of 3. Thus, the entry at index 4E8 in the branch history table 110 will be updated from 2 to 3 based on the fact that the branch was taken.

Figure 3:
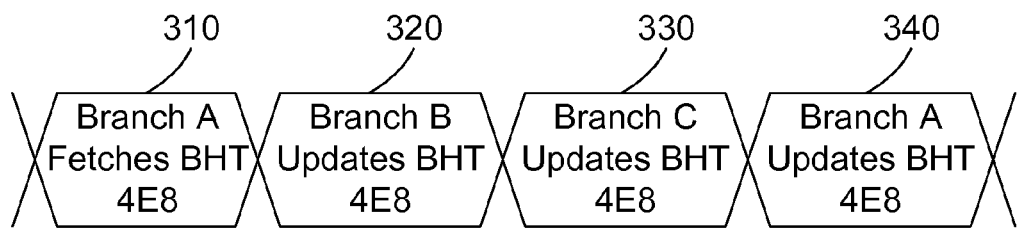
FIG. 3 is a timing diagram that illustrates how a saved branch history counter value can become stale.

Known systems for using branch history information save the BHT counter value when it is fetched, then update the saved BHT counter value once the branch is actually taken or not. This prevents the need of reading the current counter value before updating the BHT counter value. A BHT table is typically so busy with fetches that there is insufficient bandwidth on the read port to perform a second read before updating an entry in the branch history table. However, saving the fetched BHT counter value, then later updating the saved BHT counter value, can result in stale data in the BHT counter value. Referring to FIG. 3, a simple timing diagram illustrates the problem of stale data in a saved BHT counter value. At time period 310 in FIG. 3, Branch A fetches the entry in the branch history table at index 4E8. Referring to FIG. 1, the value at index 4E8 is 2, as shown in the branch history table 110. In time period 320, a different branch, Branch B, updates the entry in the branch history table at index 4E8. In time period 330, a third Branch C updates the entry in the branch history table at index 4E8. We assume for this example the updates in time periods 320 and 330 decrement the value of the entry at 4E8 in the branch history table, which means Branch B and Branch C were not taken. Because the value of entry 4E8 in the BHT table was 2 in time period 310, and was decremented twice in time periods 320 and 330, the current value of entry 4E8 in the branch history table 110 in time period 340 is 0. However, when branch A updates the BHT entry 4E8 in time period 340, it does so based on the saved value of 2 that was fetched in time period 310. If Branch A is taken, entry 4E8 will be updated in time period 340 to the value of 3. If the current value of entry 4E8 were used instead, the entry would be updated to a value of 1. If Branch A is not taken, entry 4E8 will be updated in time period 340 to the value of 1. If the current value of entry 4E8 were used instead, the entry would be updated to a value of 0. This shows how stale data can negatively impact the quality of branch predictions. Benchmark tests have shown this staleness can hurt performance by decreasing branch prediction accuracy, generally about one percent on branch prediction sensitive benchmarks.

As used herein, a branch history table counter means an entry in the branch history table, such as entry at index 4E8 shown in FIG. 1. Branch history table is often abbreviated herein to BHT for the sake of convenience. A value of a BHT counter or entry means the value of a branch history table counter (e.g., 0, 1, 2 or 3 for two-bit saturating counters). A saved BHT counter value means the value saved when the BHT counter value was fetched. The BHT counters are saturating counters, which means an attempt to increment a maximum value of the counter results in the same maximum value, and an attempt to decrement a minimum value of the counter results in the same minimum value, while incrementing and decrementing between the minimum and maximum occur the same as in typical binary counters, by increasing the value of the counter by one or decreasing the value of the counter by one.

Figure 4:
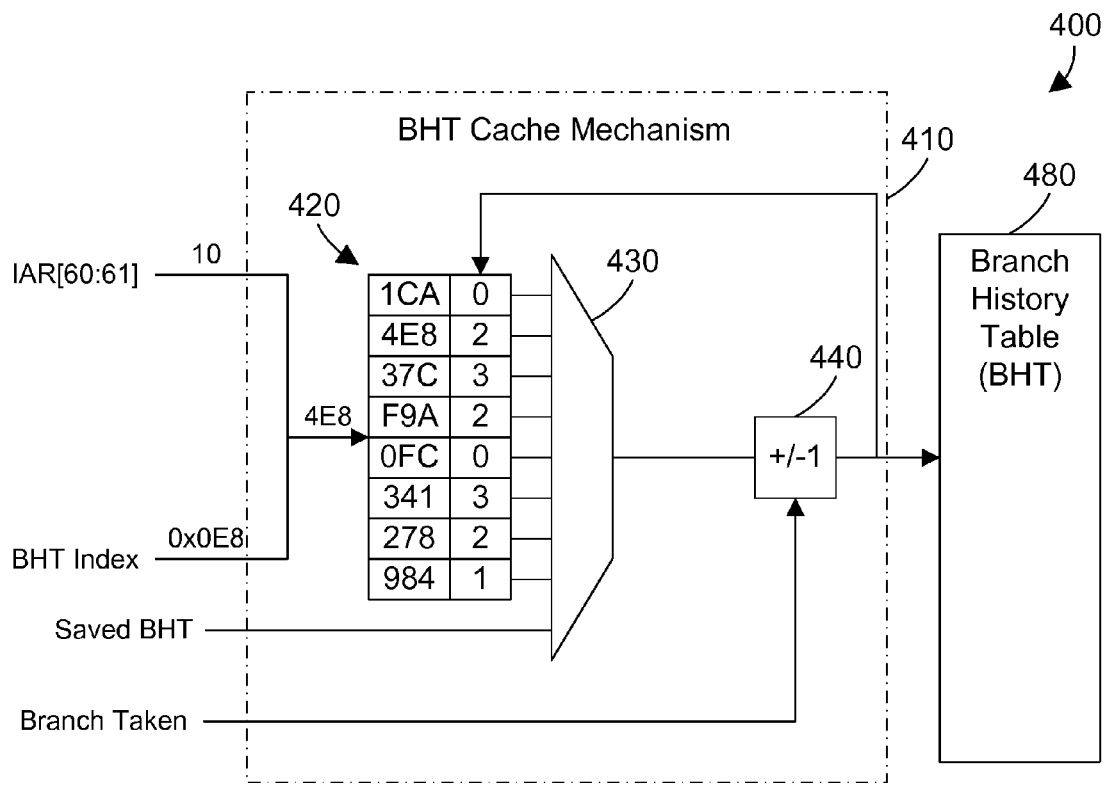
FIG. 4 is a block diagram of a branch history table cache mechanism that caches values of branch history counters written to the branch history table.
Figure 5:
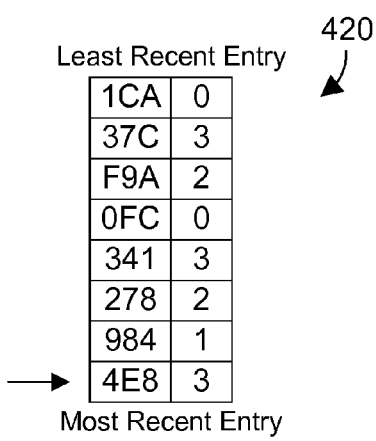
FIG. 5 is a block diagram showing how an entry in the BHT cache moves to the most recent entry when the corresponding BHT counter is updated.

Referring to FIG. 4, an apparatus 400 includes a branch history table 480 and a branch history table (BHT) cache mechanism 410. The branch history table 480 could have an identical or similar configuration as shown in prior art branch history table 110 shown in FIG. 1, or could have a different configuration. While the address lines used to address (or index) the branch history table 480 are not shown in FIG. 4, one skilled in the art will recognize the branch history table 480 includes suitable address or index lines, such as those shown in FIG. 1. The BHT cache mechanism 410 includes a BHT write cache 420, a selector 430, and an updater 440. The BHT cache mechanism 410 receives a BHT index and two bits from an instruction address register (IAR), and concatenates the two to generate an index into the cache 420 and into the branch history table 480. For the example shown in FIG. 4, the BHT index of 0x0E8 has the two address bits IAR[60:61] with a value of 10 concatenated on its front-end, resulting in the index 4E8 into the cache 420 and into the branch history table 480. When a BHT entry is fetched from the branch history table 480, the fetched value is saved, but is not stored in the cache 420 because cache 420 is a write cache. Note the write cache 420 is shared by all branches that access the branch history table 480. When a branch needs to update a branch history table entry after the branch actually taken has been determined, the BHT cache mechanism 410 determines whether the entry resides in the write cache 420. If so, the selector 430 selects the value of the entry, and the updater 440 increments the value when the branch was taken, and decrements the value when the branch was not taken. The resulting value is stored in both the write cache 420 and the branch history table 480. When the value is stored in the write cache 420, it is stored in the most recent entry, as shown in FIG. 5. Thus, for the example in FIG. 4, we assume the cached value for index 4E8 of 2 was incremented to indicate the branch was taken, resulting in an updated value of 3 being written to the most recent entry of the cache, as shown in FIG. 5. Note the other entries in the cache 420 shown in FIG. 5 retain their same order as shown in FIG. 4 and shift to fill the gap, with the entry for index 4E8 being moved from the second least recent entry shown in FIG. 4 to the most recent entry shown in FIG. 5. If the branch history table entry that needs to be updated is not in the write cache 420, the selector 430 selects the saved BHT value (the value saved when the BHT entry was fetched), and the updater 440 increments or decrements the saved BHT value to generate the update in the branch history table 110. Note the updated value is also stored in the write cache 420.

Figure 6:
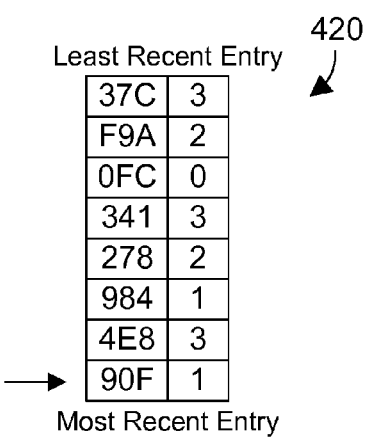
FIG. 6 is a block diagram showing how an entry is added to the most recent entry of the BHT cache, with the least recent entry being flushed from the cache.

We assume that after the entry at index 4E8 is updated as shown in FIG. 5, the entry at index 90F is updated from a 2 and decremented to indicate the branch was not taken, resulting in the entry at index 90F having a value of 1 written to the most recent entry in the write cache 420, as shown in FIG. 6. Note the least recent entry at index 1CA in FIG. 5 is dropped from the cache, and the entry at index 37C becomes the least recent entry in the write cache 420. The write cache is thus a fully associative cache with true least recently used replacement. Tests have shown that an eight-entry cache works quite well, resulting in performance gains of 0.7% on SPEC and 1.25% on CoreMark when compared to the prior art design. SPEC is a benchmark developed by the Standard Performance Evaluation Corporation, and CoreMark is a benchmark developed by the Embedded Microprocessor Benchmark Consortium. Such a small write cache may be easily implemented as a latch-based design, which eliminates the latency issues associated with arrays, as well eliminating any read-modify-write limitations.

With apparatus 400 shown in FIG. 4, we see that the problem of stale data discussed above with respect to FIG. 3 does not exist. Let's assume the value of 2 is fetched from the branch history table 480 for index 4E8 in time period 310 shown in FIG. 3. When branch B updates the BHT at index 4E8 in time period 320, the value of 2 in the cache will be selected and updated. We assume the branch was not taken, so the value of 2 in the cache for index 4E8 is decremented to 1 in both the cache and the branch history table. When branch C updates the BHT at index 4E8 in time period 330, the value of 1 in the cache will be selected and updated. We assume the branch was not taken, so the value of 1 in the cache for index 4E8 is decremented to 0 in both the cache and the branch history table. When branch A updates the BHT at index 4E8 in time period 340, the value of 0 in the cache will be selected and updated. We assume branch A was taken, so the value of 0 in the cache for index 4E8 will be incremented to 1 in both the cache and the branch history table. The cache prevents the issue of stale data because the cache will always contain the current value of all BHT indexes stored in the cache. If an index not in the cache needs to be updated, the BHT value that was saved when the value was fetched form the branch history table is updated and stored in both the cache and the branch history table.

Figure 7:
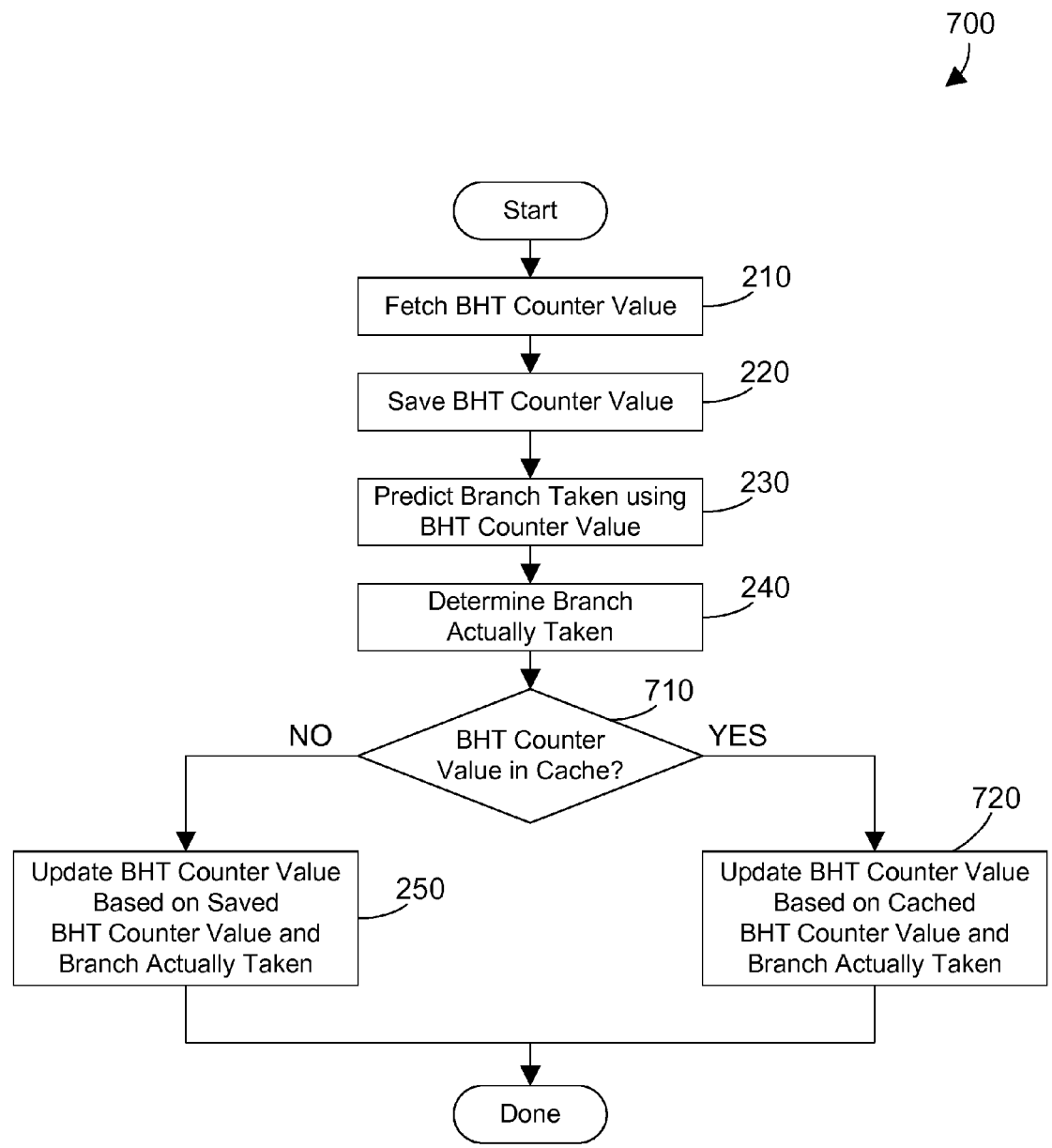
FIG. 7 is a flow diagram of a method performed by the BHT cache mechanism in FIG. 4.

Referring to FIG. 7, a method 700 is preferably performed by a BHT cache mechanism, such as BHT cache mechanism 410 in FIG. 4. Note that steps 210, 220, 230, 240 and 250 are the same steps used in prior art method 200 shown in FIG. 2. A BHT counter value is fetched (step 210). The fetched BHT counter value is saved (step 220). The counter value is then used to predict the branch taken (step 230). The branch actually taken is then determined (step 240). When there is a BHT counter value in the cache (step 710=YES), the BHT counter value is updated based on the cached BHT counter value and the branch actually taken (step 720). When the BHT counter value is not in the cache (step 710=NO), the BHT counter value is updated based on the saved BHT counter value and the branch actually taken (step 250). Note the updates in steps 250 and 720 update both the branch history table as well as the write cache. Method 700 is then done.

In a system that supports software multithreading, there are different ways to implement the BHT cache mechanism. One possibility is to allow different threads to share the same cache. This can create problems due to the possibility of overcorrection when a "one off" direction change (e.g., end of loop) occurs simultaneously or nearly simultaneously on multiple threads. Another option is to have the index include a thread identifier, which will thus allow only matches from the same thread. Yet another option is to implement a separate write cache for each thread. One skilled in the art will readily know how to modify the apparatus 400 shown in FIG. 4 to accommodate these three different options discussed above.

Figure 8:
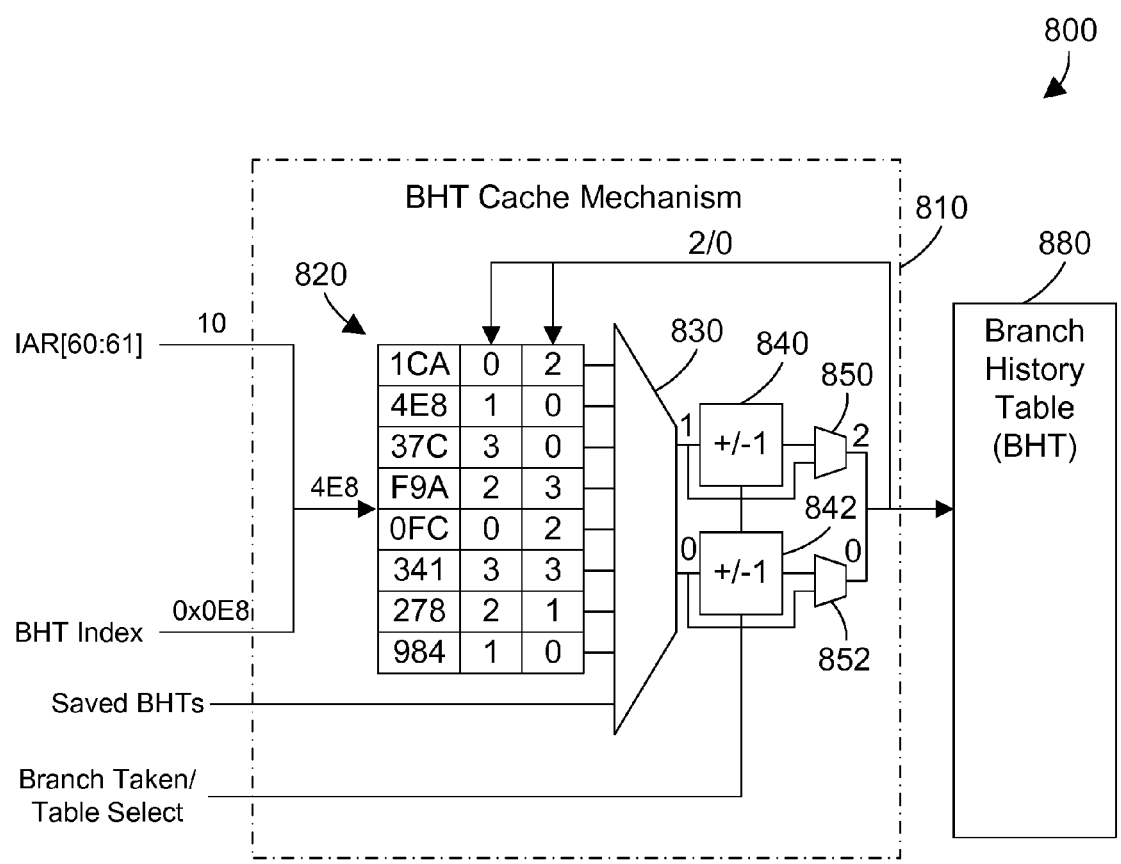
FIG. 8 is a block diagram of a branch history table cache mechanism that caches two BHT counter values for each entry in the branch history table.

Referring to FIG. 8, an apparatus 800 includes a BHT cache mechanism 810 and a branch history table 880. The BHT cache mechanism 810 includes a write cache 820, a first selector 830, updaters 840 and 842, and selectors 850 and 852. Many modern branch predictors use multiple branch history tables for more sophisticated predictions. In such a design, the BHT cache mechanism 810 may be used. The BHT 880 is assumed to have two tables, each with a separate counter. Predictions are made by reading both BHT tables, and a separate "which BHT table to use" chooser table. In this example, the chooser table contains 1-bit entries, so there is no need to cache its updates, because and update is either "set to 0" or "set to 1", not incrementing or decrementing an existing value. However, the chooser table will be updated at the same time the BHT tables are updated in the branch history table. When the entry is fetched, both BHT tables are read, and the values of both BHT counters are saved. When the BHTs are updated, the index is matched in the BHT write cache, which results in two counters being read. These two counters are updated in the same way as describe above with respect to FIG. 4, i.e., the updated values are written to both the cache 820 and the branch history table 880. For the example shown in FIG. 8, the entry at index 4E8 is found in write cache 820, with values of 1, 0. When the entry at index 4E8 needs to be updated after the branch was actually taken or not taken, the selector 830 selects the counters from the cache entry at index 4E8, resulting in outputting the values 1 and 0 as shown to the right of the selector. The updaters 840 and 842 then update their respective counters according to whether or not the branch was taken. Selectors 850 and 852 are controlled by the same signal, with selector 850 outputting its first input when the control signal is in the first state, and outputting its second input when the control signal is in the second state. Selector 852 works in an opposite fashion, outputting its second input when the control signal is in the first state, and outputting its first input when the control signal is in the second state. In this manner, only one of the two counters updates is selected. For the specific example in FIG. 8, we assume the first counter is updated by incrementing the counter with a value of 1 to indicate the branch was taken, which results in the updater updating the output to 2 and the selector 850 selects that output. The selector 852 selects the unchanged input 0 and outputs this value. The result is the values 1, 0 in the branch history table and in the write cache at index 4E8 are updated to the values 2, 0. FIG. 8 illustrates the write cache may be extended to any suitable number of counters for a given index.

The branch history table cache disclosed herein is a write cache that stores values of branch history counters written to a branch history table. An update to a branch history table counter is reflected in both the branch history table cache and the branch history table. Before a branch history table counter is updated, a check is made to see if the branch history table counter is in the cache. If not, the branch history table counter is updated based on a value of the branch history table counter that was saved during fetch of the branch history table counter. If, however, the branch history table counter value is in the cache, the value in the cache is used to update the branch history table counter. All branches that use the branch history table counter update the correct counter value, improving processor performance by providing more accurate predictions of branches taken.

One skilled in the art will appreciate that many variations are possible within the scope of the claims. Thus, while the disclosure is particularly shown and described above, it will be understood by those skilled in the art that these and other changes in form and details may be made therein without departing from the spirit and scope of the claims.

The invention claimed is:

1. An apparatus comprising:
   a cache that stores a plurality of branch history table entries from a branch history table, each branch history table entry having an index and a corresponding value, wherein each corresponding value comprises a saturating counter, wherein each branch history table entry may be read by a plurality of branches; and
   a branch history table cache mechanism that saves a fetched value for a requested branch history table entry, receives requests from the plurality of branches, determines whether the requested branch history table entry requested by a selected branch is in the cache, and when the requested branch history table entry requested by the selected branch is in the cache, updates the requested branch history table entry in the cache and in the branch history table at the same time based on whether the selected branch was taken or not taken and based on the value in the requested branch history table entry in the cache, and when the branch history table entry requested by the selected branch is not in the cache, the branch history table cache mechanism updates the requested branch history table entry based on whether the selected branch was taken or not taken and based on the fetched value for the requested branch history table entry.

2. The apparatus of claim 1 wherein the branch history table cache mechanism writes the requested branch history table entry to a most recent entry in the cache and drops a least recent entry in the cache.

3. The apparatus of claim 1 wherein the branch history table mechanism updates the requested branch history table entry by incrementing by one the branch history table entry in the cache and in the branch history table when the selected branch is taken, and by decrementing by one the branch history table entry in the cache and in the branch history table when the selected branch is not taken.

4. The apparatus of claim 1 wherein the cache and the branch history table each comprises a plurality of values for each entry, and wherein the branch history table cache mechanism updates the plurality of values.

5. The apparatus of claim 4 wherein the branch history table cache mechanism selects one of the plurality of values for updating and does not change other of the plurality of values during the update of the one of the plurality of values.

6. A method for updating a branch history table entry in a branch history table, the method comprising the steps of:
providing a cache that stores a plurality of branch history table entries from the branch history table, each branch history table entry having an index and a corresponding value, wherein each corresponding value comprises a saturating counter, wherein each branch history table entry may be read by a plurality of branches;
saving a fetched value for a requested branch history table entry;
receiving requests from the plurality of branches for a branch history table entry;
determining whether the requested branch history table entry requested by a selected branch is in the cache;
when the requested branch history table entry is in the cache, updating the requested branch history table entry in the cache and in the branch history table at the same time based on whether the selected branch was taken or not taken and based on the value in the requested branch history table entry in the cache; and
when the requested branch history table entry is not in the cache, updating the requested branch history table entry based on whether the selected branch was taken or not taken and based on the fetched value for the requested branch history table entry.

7. The method of claim 6 wherein the step of updating the requested branch history table entry in the cache writes the requested branch history table entry to a most recent entry in the cache and drops a least recent entry in the cache.

8. The method of claim 6 wherein the step of updating the requested branch history table entry comprises the steps of:
incrementing by one the requested branch history table entry in the cache and in the branch history table when the selected branch is taken; and
decrementing by one the requested branch history table entry in the cache and in the branch history table when the selected branch is not taken.

9. The method of claim 6 wherein the cache and the branch history table each comprises a plurality of values for each entry, and further comprising the step of updating the plurality of values.

10. The method of claim 9 wherein the step of updating the plurality of values updates one of the plurality of values and does not update other of the plurality of values.

11. An apparatus comprising:
a cache that stores a plurality of branch history table entries from a branch history table, each branch history table entry having an index and a corresponding value, wherein each corresponding value comprises a saturating counter, wherein each branch history table entry may be read by a plurality of branches; and
a branch history table cache mechanism that receives requests from the plurality of branches, determines when a branch history table entry requested by a selected branch is in the cache, and updates the requested branch history table entry in the cache and in the branch history table at the same time based on whether the selected branch was taken or not taken and based on the value in the requested branch history table entry in the cache, wherein the branch history table cache mechanism writes the requested branch history table entry to a most recent entry in the cache and drops a least recent entry in the cache, wherein the branch history table mechanism updates the requested branch history table entry by incrementing by one the requested branch history table entry in the cache and in the branch history table when the selected branch is taken, and by decrementing by one the requested branch history table entry in the cache and in the branch history table when the selected branch is not taken, wherein the branch history table cache mechanism saves a fetched value for the requested branch history table entry, and when the branch history table cache mechanism determines the requested branch history entry is not in the cache, the branch history table cache mechanism updates the requested branch history table entry based on whether the selected branch was taken or not taken and based on the fetched value for the requested branch history table entry.

12. The apparatus of claim 11 wherein the cache and the branch history table each comprises a plurality of values for each entry, and wherein the branch history table cache mechanism updates the plurality of values.

13. The apparatus of claim 12 wherein the branch history table cache mechanism selects one of the plurality of values for updating and does not change other of the plurality of values during the update of the one of the plurality of values.

14. A method for updating a branch history table entry in a branch history table, the method comprising the steps of:
providing a cache that stores a plurality of branch history table entries from the branch history table, each branch history table entry having an index and a corresponding value, wherein each corresponding value comprises a saturating counter, wherein each branch history table entry may be read by a plurality of branches;
receiving requests from the plurality of branches for a branch history table entry;
determining when a branch history table entry requested by a selected branch is in the cache;
saving a fetched value for a requested branch history table entry;
updating the requested branch history table entry in the cache and in the branch history table at the same time based on whether the selected branch was taken or not taken by writing the requested branch history table entry to a most recent entry in the cache and dropping a least recent entry in the cache, wherein the step of updating the requested branch history table entry in the cache performs the steps of:
  incrementing by one the requested branch history table entry in the cache when the selected branch is taken;
  decrementing by one the requested branch history table entry in the cache when the selected branch is not taken;
updating the requested branch history table entry in the branch history table based on whether the selected branch was taken or not taken by performing the steps of:
  incrementing by one the requested branch history table entry in the branch history table when the selected branch is taken and based on the fetched value for the requested branch history table entry;
  decrementing by one the requested branch history table entry in the branch history table when the selected branch is not taken and based on the fetched value for the requested branch history table entry; and
  storing the branch history table entry in the cache.

15. The method of claim 14 wherein the cache and the branch history table each comprises a plurality of values for each entry, and further comprising the step of updating the plurality of values.

16. The method of claim 15 wherein the step of updating the plurality of values updates one of the plurality of values and does not update other of the plurality of values.

* * * * *